United States Patent [19]

Bardoncelli et al.

[11] 3,900,551

[45] Aug. 19, 1975

[54] SELECTIVE EXTRACTION OF METALS FROM ACIDIC URANIUM (VI) SOLUTIONS USING NEO-TRIDECANO-HYDROXAMIC ACID

[75] Inventors: Franco Bardoncelli; Giuseppe Grossi, both of Rome, Italy

[73] Assignee: Comitato Nazionale per l'Energia Nucleare, Rome, Italy

[22] Filed: Mar. 2, 1972

[21] Appl. No.: 231,377

[30] Foreign Application Priority Data
Mar. 2, 1971  Italy.................................. 48741/71

[52] U.S. Cl. .................. 423/9; 423/20; 423/63; 423/70; 423/81; 423/253; 423/139; 260/500.5 H
[51] Int. Cl. ..................... B01d 11/04; C01g 43/00
[58] Field of Search......... 23/312 ME; 260/500.5 H; 423/9, 20, 63, 70, 81, 253, 139

[56] References Cited
UNITED STATES PATENTS

| | | | |
|---|---|---|---|
| 3,345,344 | 10/1967 | Fetscher | 260/500.5 H |
| 3,419,603 | 12/1968 | Lipowski | 260/500.5 H |
| 3,464,784 | 9/1969 | Swanson | 260/500.5 H |

FOREIGN PATENTS OR APPLICATIONS

| | | | |
|---|---|---|---|
| 894,119 | 4/1962 | United Kingdom | 260/500.5 H |

OTHER PUBLICATIONS

Nuclear Science Abstracts, Vol. 17, No. 23, Dec. 15, 1963, pp. 5268–5269.
ORNL – 3994, Chem. Dir. Ann. Prog. Rep., Sept., 1966, pp. 63 and 64.
Nuclear Science Abstracts, Vol. 25, No. 11, June 15, 1971, p. 2340.
Radiochem., Radioaval. Letters, 5/4–5/pp. 201–204 (1970). Author – Neirinckex.

*Primary Examiner*—A. Louis Monacell
*Assistant Examiner*—S. J. Emery
*Attorney, Agent, or Firm*—Richards & Geier

[57] ABSTRACT

According to this invention neo-alkyl-hydroxamic acids are employed as ion-exchanging agents in processes for liquid-liquid extraction with the aim of separating, purifying dissolved metals and of converting a metal salt solution into a solution of a salt of the same metal but with different anion. In particular it is an object of this invention to provide a method whereby a molecular pure uranium solution is obtained by selective extraction from a uranium solution delivered by irradiated fuel reprocessing plants and containing plutonium, fission products and other unwanted metals, in which method neo-tridecane-hydroxamic acid is employed as ion exchanger.

2 Claims, No Drawings

SELECTIVE EXTRACTION OF METALS FROM ACIDIC URANIUM (VI) SOLUTIONS USING NEO-TRIDECANO-HYDROXAMIC ACID

The present invention relates in general to the use of liposoluble hydroxamic acids with neo structure as selective extractants either in the field of nuclear technology or in the field of conventional technologies with the purpose of recovering, separating and purifying dissolved metals and for converting a metal salt into a solution of salts of the same metal but with different anions. In particular it is an object of this invention to provide a process for purifying — that is for freeing from traces of plutonium, neptunium, zirconium, niobium, and iron — the uranium product, either natural or enriched from irradiated fuel reprocessing plants.

As known, the problem of the final purification of uranium is most important in as much as, when during the various reprocessing steps the required decontamination has not been attained, it is essential to resort to additional purification processes in order to obtain a final product in accordance with the specifications.

In fact by the current specifications, the alpha activity orginating from uranium and from other transuranium elements should be lower than 15,000 dis/sec per gram of recovered uranium, while the beta-gamma activity originating from the fission products should not be more than three times the product activity in equilibrium of radioactive decay.

The final product should also be free from other non-radioactive elements such as V, Cr, Mo, W, S, Fe, halogens, B, Nb, Ti, Ta.

The final purification processes included in the reprocessing plants generally rely on silica-gel or exchanging resins towers. However the purpose of silica gel towers is mainly for lessening the content of zirconium and niobium 95 in the final product while they are not suitable for freeing it from other undesirable elements.

Those processes wherein ion (anion) exchange resins are employed are usually directed to free plutonium from uranium and from fission products. An accurate conditioning of plutonium to its valence IV is required by such processes and this is obtained by adding foreign substances and by adjusting the nitric acid concentration at about 7 M.

The obtainment of a uranyl nitrate solution with "nuclear purity" as a result of reprocessing irradiated fuel elements is exclusively dependent on an accurate implementation of the purification steps which generally include several extraction counter current cycles with suitable solvent.

The removal of any traces of alpha emitting elements and other unwanted elements from solutions of uranium — either natural or enriched — does not appear feasible to-day without resorting to further purification cycles.

According to this invention neo-alkyl-hydroxamic acids are employed as ion-exchanging agents in processes for liquid-liquid extraction with the aim of recovering, separating and purifying dissolved metals and of converting a metal salt solution into a solution of a salt of the same metal but with different anion.

The main advantage of such method is that the liquid-liquid extraction is carried out in a single step that is between two solutions which remain the same during the extraction; furthermore the extraction times are short and the selectivity of the extracting solution — with respect to the ions — can be controlled by adjusting the pH value and the hydroxamic acid concentration.

A further object of this invention is to provide a method whereby a nuclearly pure uranium solution is obtained by selective extraction from an uranium solution delivered by an irradiated fuel reprocessing plant and containing plutonium, fission products and other unwanted metals; in which method neotridecanohydroxamic acid is employed as ion exchanger. This method has the advantage that, in the case of acid by nitric acid solutions, no freeing substances are to be added as required for maintaining the plutonium valence at its value 4.

This advantage originates from the twofold property of liposoluble hydroxamic acids of acting at the same time as complexing agents with high selectivity and as substances adapted for causing oxidation-reduction reactions.

Neo-hydroxamic acids which according to this invention are used as ion exchanging agents have in their structural formula the hydroxamic function bound to a tertiary carbon atom; that is

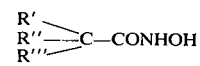

When radicals R′, R″, R‴ are enough long and branched (so that the total number of carbon atoms in the molecule is greater than 10) these compounds — due to their particular molecule structure — are totally soluble in all organic solvents and very little soluble in water and therefore with respect to those solvents which are not miscible with water, the distribution coefficient or distribution ratio of these compounds is very favourable for employing them in liquid-liquid extraction.

For the same reasons of molecular structure, neo-hydroxylaminic acids are highly stable with respect to hydrolysis and to the attack by chemical agents.

Such properties of solubility and stability differentiate these compounds from other hydroxamic acids even if N-substituted (for instance from such acids as benzo-hydroxamic, acetohydroxamic, n-octane-hydroxamic, n-dodecyl-hydroxamic, N-phenyl-benzo-hydroxamic).

Neo-alkyl-hydoxamic acids when dissolved in suitable solvents behave as cation liquid exchangers with a selectivity of action towards metal ions which is dependent on the pH value of the aqueous solutions and on the neo-hydroxamic acid concentration according to the following reaction pattern:

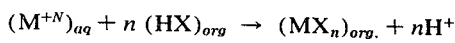

Aqueous solutions after being treated with neo-hydroxamic acids remain contaminated by traces of C and N only and this is a remarkable advantage when said solutions are to be used in those processes of which the final product is to be free from undesirable elements such as P, S, As etc.

The extracted metal ions can be quantitatively recovered into aqueous solutions with simultaneous regeneration of the solvent. Due to the remarkable chemical stability of neo-hydroxamic acid, this can be used for further extraction processes.

Re-extraction of the metal ion into aqueous phase can be effected by means of mineral acids or organic acids of various kinds.

Thus a uranyl nitrate solution can be very simply converted into a solution — even more concentrated — of uranyl sulphate, chloride, acetate, fluoride with no contamination by the original anion. Because hydroxamic acids are acylated derivatives from hydroxylamine they possess — although in a lesser amount — the well known reducing properties of hydroxylamine itself. This means that, differently from the other cation liquid exchangers, neo-hydroxamic acids can act simultaneously as extractant and as reducing agents.

Towards those metal ions which have multiple volence states their action is therefore twofold: on one side as reducing agents they tend to bring the upper valence states down to lower valence states, on the other side as chelating-extracting agents they tend to stabilize that valence state with which they can form the most stable and more extractable chelates.

For satisfactorily attaining the objects of this invention, a particular neo-hydroxamic acid has been employed that is the neo-tridecane-hydroxamic acid of which the formula is the following:

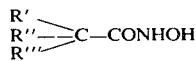

wherein $R' + R'' + R''' = C_{11}H_{25}$.

For preparing it a method has been used which is already known for preparing hydroxamic acids in general.

According to this method one mole of neo-tridecanoic acid is refluxed with two moles $SOCl_2$; 100 distilled acid chloride are reacted with 60g hydroxylamine chlorohydrate in pyridine with vigorous stirring and cooling the reaction mixture. After 48 hours stirring at room temperature the major part of pyridine is distilled under vacuum. To the residue 200 ml n-heptane and 100 ml water are added.

After stirring the aqueous phase is discarded, the organic phase is washed with 100 ml aliquots HCl 1M and finally with an equal volume saturated $NaHCO_3$. After treating with anhydrous $NaSO_4$ the solvent is totally removed at reduced pressure; a yellow oil is obtained which is very viscous and tends to slowly transform into a white waxy solid. The total yield is 80%.

In Table 1 some of the characteristic data of neo-tridecane-hydroxamic acid are listed:

Table 1 characteristic data of neo-tridecane-hydroxamic acid

| | |
|---|---|
| Average molecular weight | $233 \pm 6$ |
| Ionization constant at 25°C | pka = 10.08 |
| Distribution coefficient for aqueous phases with pH in the range from 0 to 9 of 0.1 M solutions | a) xilene $D_a^\circ = 280$ <br> b) heptane $D_a^\circ = 95$ <br> c) chloroform $D_a^\circ = 860$ |
| Chemical stability towards acids (continuous stirring, phase ratio 1 : 1; 0.1 M solutions) | HCl    1–10M no titer <br> $H_2SO_4$    1– 5M change <br> $NClO_4$    1– 5M after 1 <br> $HNO_3$    1– 5M* month |
| Stability towards oxidizing agents (0.1 M solutions) | $Ce^{+4}$ <br> $MnO_4$    gradual decrease of titre <br> $HNO_2$    total oxidation in 1 minute |

*in the absence of $HNO_2$.

In the following Table 2 the minimum pH values are reported beyond which a quantitative extraction of metal ions can be carried out with a neo-tridecano-hydroxamic acid 0.1 M solution in xylene.

From table 2 it appears that very good separations can be effected by suitably controlling the pH value of the aqueous phases.

In the case of strongly acid aqueous solutions, any control on pH being superfluous, extractions can be carried out in a very simple selective manner.

In many cases intense colorations are caused by extractions into organic phase which allow a direct quantitative determination of the extracted metal.

Table 2

Extractive behaviour of a neo-tridecane-hydroxamic 0.1 M solution in xylene towards some metal ions.

| Lowest pH value of the aqueous phase for a 100% extraction phase ratio 1:1 | Extracted ions (the underlined ions give colorations in the visible range in aqueous phase. |
|---|---|
| 0 | Zr(IV), Nb(V), Fe(III), Pu(IV) Np(IV), Ti(IV), V(V), Hf(IV), Po(IV), Ta(V) |
| $\geq 2$ | U(IV), Th(IV), Pa(V), Bi(III) |
| $\geq 4$ | U(VI), Cu(II), Cr(III), |
| $\geq 6$ | Rare earth(III), Am(III), Ni(II), Pb(II), Y(III) |
| $\geq 9$ | Ca, Sr, Ba, Ra(II) |

The extraction of metal ions takes place in every case with a very rapid kinetics differently from other cation liquid exchangers (for instance thenoyltrifluoroacetone); with respect to them the compounds have also the advantage of attaining in many cases high saturations of the extracted metal.

The hydroxamic acid concentration to be employed in separation and/or recovery processes is dependent on the amount of metal to be extracted.

When the element to be recovered is in macroscopic quantity, the neo-alkylhydroxamic acid can be raised up to values in the range from 1 to 2 M.

When the element to be recovered is not in macroscopic quantitative extractions can be effected with hydroxamic acid at concentrations in the order of 0.001M (Table 3).

Table 3

Distribution coefficients of some metal ions with diluted neo-hydroxamic acid solutions.

| Metal ion | Neo-hydroxamic acid concentration in xylene (M) | Distribution coefficient from $HNO_3$ 1M |
|---|---|---|
| $Fe^{+++}$ | $4.10^{-2}$ | 30 |
| $Zr^{+4}$ | $1.10^{-3}$ | 80 |
| $Nb^{+5}$ | $1.10^{-3}$ | 20 |
| $Pu^{+4}$ | $1.10^{-2}$ | 45 |

Basing on the above, the following processes have been developed for exploiting the neo-tridecane-hydroxamic acid properties.

1. A process for freeing uranium (either natural or enriched) from plutonium, neptunium, zirconium, niobium, traces by means of neo-tridecane-hydroxamic acid.

Such process is based on the above mentioned extractive properties of neo-tridecane-hydroxamic acid. In fact from Table 2 it becomes apparent that Pu, Np, Fe, Zr can be neatly separated from uranium by means of this acid.

Pu - U distribution coefficients in the order of $10^4$ to $10^5$; Zr - U distribution coefficients in the order of $10^6$; Nb - U distribution coefficients in the order of $10^6$ and Np - U distribution coefficients in the order of $10^3$ are attained with a single contact by treating uranium solutions at concentrations in the order of 150 g/l at a nitric acidity up to 5M with neo-tridecane-hydroxamic acid 0.1M in aromatic diluents.

Any corrosion products such as $Fe^{+3}$, $V^{+5}$, $Ti^{+4}$ and $Ta^{+5}$ are simultaneously removed from uranium with distribution coefficients greater than $10^3$.

The extraction kinetics is generally very rapid except in the case of Pu and Np at upper valence states. In these cases neo-hydroxamic acid, as already mentioned, exhibits the remarkable property of reducing all the valence states to the state tetra with which it is capable of forming the more stable extractable chelates.

Some examples follow of the above described process which have been carried out at room temperature.

EXAMPLE 1

50 ml 0.1M tridecane-hydroxamic acid solution in xylene are used to decontaminate from plutonium(IV) 250 ml uranyl nitrate solution.

The aqueous solution composition is as follows:

| Uranyl Nitrate | 0.5M |
|---|---|
| Nitric acid | 5.0M |
| Plutonium | $10^{-4}M$ |

To this solution 2 to 3 ml urea 1M aqueous solution and subsequently the hydroxamic acid organic solution are added.

The mixture is shaked over 10'. After clarifying the resultant emulsion, the uranyl nitrate aqueous emulsion is found free from alpha activity, due to plutonium.

EXAMPLE 2

The same process of Example 1 is applied to a case wherein plutonium(VI) is present; that is with a solution of which the composition is as follows:

| Uranyl nitrate | 0.5M | |
|---|---|---|
| Nitric acid | 5M | |
| Total Pu | $10^{-4}M$ | Pu(IV) 25% |
| | | Pu(VI) 75% |

After 1 hour stirring at 25°C the aqueous solution is found free from plutonium.

EXAMPLE 3

The same process of the preceding examples is applied to a case wherein Zr-95 and Nb-95 are present. 50 ml aqueous solution is used with the following composition:

| Uranyl Nitrate | 0.5M |
|---|---|
| Nitric acid | 3.0 to 5.0M |
| Zr–95 (Nb–95) | 25,000 cpm/ml. |

100 microliter 1M urea solution and subsequently 10ml 0.1M neo-tridecane-hydroxamic acid solution in xylene are added. The resulting mixture is shaked over 10'

The resulting aqueous solution is found free from gamma activity due to Zr-Nb-(95).

EXAMPLE 4

The same process of example 3 is applied to a case wherein Pu and Zr-95 (Nb-95) are present. After 10' shaking with 0.1M tridecane-hydroxamic acid solution in xylene the resulting aqueous solution is found free from Pu(IV) and from Zr-95 (Nb-95). After 1 hour the total Pu found appears to be removed.

EXAMPLE 5

The same process of example 1 is applied to the case wherein the uranyl nitrate solution is contaminated with a $10^{-3}M$ Np solution and with a $10^{-4}M$ Pu solution.

After 1 hour the organic phase contains all the alpha activity due to the above two contaminants.

EXAMPLE 6

50 ml 0.5M uranyl nitrate solution with $Fe^{+3}$, $V^{+5}$, $Ti^{+4}$ at the following concentrations

| $Fe^{+3}$ | $3.10^{-3}M$ |
|---|---|
| $N^{+5}$ | $1.10^{-3}M$ |
| $Ti^{+4}$ | $1.10^{-3}M$ |
| $HNO_3$ | 1M | is treated with 20 ml 0.1M neo-tridecane-hydroxamic acid solution in xylene. After shaking over 15' the uranium solution is found free from said ions.

From examples 1, 2 it appears that while a complete decontamination of a uranyl nitrate solution from plutonium is very rapidly achieved when the valence state of plutonium is four, a longer shaking time is required for those solutions wherein Pu(VI) is contained in addition to Pu(IV).

The reduction velocity of Pu(VI) depends mainly on the solution acidity and on the process temperature. Therefore the time required for the total removal of all the contaminating species can be remarkably reduced by a proper choiche of these parameters.

The uranium losses in the above described purification processes are negligible in as much as by a single washing with 1M $HNO_3$ of the organic phase the uranium concentration is reduced by a $10^3$ factor without any removal of the other extracted ions.

By the use of 1 liter 0.1M neo-tridecane-hydroxamic acid more than 100 liter 0.7M uranyl nitrate solution can be purified from Pu, Np, Zr, Nb traces in the order of $10^{-5}$M provided that any extractant oxidation by nitrous acid, which can always be present in solutions containing nitric acid and/or great amounts of nitrates, is prevented which is achieved by adding small amounts of hydroxylamine, hydrazine or urea in the aqueous phase.

The organic solutions can be regenerated by washing them with 1 M HF solutions by which all the extracted ions are removed and the solvent is restored to its integrity.

The apparatus for carrying out the extraction may comprise a simple single-stage contactor for batch production or a high capacity multistage contactor with washing section and recycling of solvent.

2. Processes for recovering plutonium, neptunium and fission products from contaminated liquids or from process wastes.

The above described extractants can be used for treating solutions in which alpha emitting ions are contained with the aim either of decontaminating liquid substances or of recovering said ions when this appears to be economically worthwhile.

The same method can be applied for extracting and possibly recovering fission products.

The manners of employing neo-hydroxamic acids in liquid-liquid extractive processes for attaining the above objects are in all similar to those already described (see para 1. A process for freeing uranium etc).

EXAMPLE 7

To 10ml solution wherein fission products are contained as per the following composition

| | |
|---|---|
| $HNO_3$ | 2M |
| Pu(IV + VI) | $5.10^{-4}$M |
| Np(IV + VI) | $3.10^{-3}$M |
| Sr-90 (Y-90) | |
| Cs-137 | total beta activity : $1.5.10^{-6}$ cpm/ml |
| Ce-144 (Pr-144) | |
| Ru-106 (Rh-106) | |

0.1 ml 1M urea solution and subsequently 10ml 1M neo-tridecanehydroxamic acid solution in xylene or in solvesso 100 (which is a trademark for a mixture of trimethylbenzenes) are aded. After 1 hour shaking the alpha activity due to Pu and Np is totally extracted into organic phase with the total decontamination from beta emitting elements.

3. Processes for converting and/or concentrating metal ion solutions by means of neo-hydroxamic acids.

From the above analysis the use of neo-hydroxamic acids in processes for converting the anion associated to the metal ion into another anion of different kind can be resorted to with no particular artifice.

In general any metal ion extracted into an organic phase can be re-extracted with mineral or organic acids at the same time with the ion exchange a concentration thereof can be achieved which depends on the phase ratio according to the following reaction pattern $$(MX_n)_{org} + (HA)_{aq} \rightarrow (MA_n)_{aq} + (HX)_{aq}$$

wherein $M^{+n}$ is the metal ion and A is the anion of the corresponding acid.

The required condition for achieving a quantitative reextraction can be obtained either by treating the organic solutions with aqueous solutions of which the pH value is at least two units lower than the pH value as required for the total extraction of the ion into organic phase, or by using aqueous solutions wherein strongly chelated anions are contained.

EXAMPLE 8

10 ml sodium acetate 2M solution is added to 50 ml uranyl nitrate 0.1 M solution in $HNO_3$.

50 ml tridecane-hydroxamic acid solution in solvesso 100 is added to the buffered solution as above. The resulting mixture is shaken over 15'. All the starting uranium is contained in the organic solution.

8a 10 ml organic solution is treated with 2 ml 1M solution $H_2SO_4$. After 2' the aqueous solution comprises pure uranyl sulphate 1 M solution.

8b

A portion of the 10 ml organic solution is treated with 2 ml 2M HCl solution. The aqueous solution after shaking and centrifuging comprises 1 M $UO_2Cl_2$ solution.

8c 2 ml HF 1 M solution is added to additional 10 ml organic solution. The aqueous solution after decontamination comprises pure $UO_2 F_2$ 1M solution.

What is claimed is:
1. A process for purifying uranium from Pu(IV), Np(IV), Zr(IV), Nb(V), Fe(III), Ti(IV), V(V), Hf(IV), Ta(V), Po(IV), comprising
preparing an U(VI) aqueous solution containing said ions and acid by strong inorganic acids at a concentration in the range from 0.1 to 5 M;
removing from said solution all the nitrous acid therein contained by adding a nitrous acid suppressor selected from urea, hydrazine or hydroxylamine;
contacting said acid solution with a liquid organic phase comprising a water-immiscible organic solvent and neo-tridecano-hydroxamic acid to extract said metal ions into the organic phase; and
separating the resultant organic phase into which said elements are transferred from the aqueous phase in which the purified uranium is left.
2. A process in accordance with claim 1, wherein said metals are Pu(IV), Np(IV), Zr(IV), Nb(V) and Fe(III) at trace amounts, said concentration of U(VI) in aqueous solution is in the range from 0.5 M to 0.7 M, said strong inorganic acid is nitric in the concentration of 3 to 5 M and said liquid organic phase is a 0.1 M solution of neo-tridecano-hydroxamic acid in an aromatic hydrocarbon.

* * * * *

UNITED STATES PATENT OFFICE
CERTIFICATE OF CORRECTION

Patent No. 3,900,551            Dated 8-19-75

Inventor(s) Franco Baroncelli et al

It is certified that error appears in the above-identified patent and that said Letters Patent are hereby corrected as shown below:

The inventor name has been changed to read:

--Franco Baroncelli--.

Signed and Sealed this sixteenth Day of March 1976

[SEAL]

Attest:

RUTH C. MASON
*Attesting Officer*

C. MARSHALL DANN
*Commissioner of Patents and Trademarks*